United States Patent Office 3,471,430
Patented Oct. 7, 1969

3,471,430
COPOLYMERS OF CYCLIC ACETALS AND FUNCTIONAL DERIVATIVES OF ACRYLIC ACIDS
Rolf Zimmerman and Hermann Hotze, Wiesbaden-Biebrich, Germany, assignors to Chemische Werke Albert, Wiesbaden-Biebrich, Germany, a corporation of Germany
No Drawing. Continuation of application Ser. No. 352,951, Mar. 18, 1964. This application Mar. 14, 1968, Ser. No. 713,263
Claims priority, application Germany, Mar. 23, 1963, C 29,458
Int. Cl. C08f *19/00*
U.S. Cl. 260—29.6         15 Claims

ABSTRACT OF THE DISCLOSURE

Thermoplastic copolymers of (1) cyclic acetals of alpha, beta unsaturated aldehydes such as 1,3-dioxanes or 1,3-dioxolanes with (2) functional derivatives of acrylic acids wherein the free acid group is blocked, and (3) optionally a third copolymerizable monomer are prepared by suspension polymerization using free radical catalysts.

---

This is a continuation of application No. 352,951 filed Mar. 18, 1964 and now abandoned. This invention is concerned with improvements in and relating to copolymers. In particular it is concerned with a copolymerisable mixture suitable for the production of copolymers, a process for the production of copolymers and copolymers and products derived therefrom. It has been proposed to produce resinous compounds from unsaturated dioxolanes, which have one or two exocyclic double bonds in the molecule, of the general formula

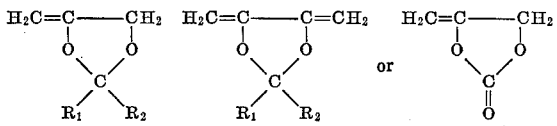

in which $R_1$ and $R_2$ are hydrogen or a saturated aliphatic radical or in which $R_1$ and $R_2$ together form a saturated cycloaliphatic radical or mixtures thereof with unsaturated compounds containing the group

using catalysts of the Friedel-Crafts type. The polymers so obtained are yellowish, or more usually reddish-brown colored, tough masses, which may be used as plasticizing agents and as additives for other resins. The polymerisation usually takes from 18 to 20 hours. The free radical polymerisation of 2-methyl-4-methylene-1,3-dioxolane with other vinyl monomers has also been proposed. This latter process only gave a resinous substance after several days. Thermoplastic copolymers which may be processed by injection molding were not obtained by these previously proposed processes.

It has also been proposed to polymerize addition products of unsaturated aldehydes with saturated aliphatic alcohols optionally also together with styrene, vinyl acetate or diallyl phthalate, the aliphatic alcohols each containing a carbon atom to which at least two methylol groups are bound, e.g. diallylidene pentaerythritol, in the presence of a polymerisation catalyst.

It has now been found that cyclic acetals of an α,β-olefinically unsaturated aldehyde, said acetals having as their sole copolymerisable groups the ethylenic unsaturation derived from said aldehyde may be polymerized with monomeric derivatives of α,β-olefinically unsaturated carboxylic acids, which contain the group

and no substantial amounts of free acid groups, in the presence of one or more polymerisation catalysts to yield thermoplastic products. Polymers so produced which contain free alcoholic hydroxyl groups, e.g. due to the use of acetals containing hydroxyl groups or monomers such as N-alkylolamides, may if desired subsequently be reacted with polyisocyanates.

According to the present invention therefore there is provided a copolymerisable mixture which comprises a cyclic acetal of an α,β-olefinically unsaturated aldehyde said acetal having as its sole copolymerisable group the olefinic unsaturation derived from said aldehyde and a monomeric derivative of an α,β-olefinically unsaturated carboxylic acid containing the group

and no substantial amount of free acid groups. Also according to the present invention there is provide a process for the production of a copolymer which comprises copolymerising such a mixture in the presence of a polymerisation catalyst.

It will be appreciated that more than one of said acetals and/or more than one monomeric derivative of said unsaturated acids may be used to form the copolymerisable mixtures and copolymers of the present invention.

The process of the invention may for example be carried out by adding the unsaturated cyclic acetal or a mixture of such acetals with one or more monomeric derivatives of an α,β-olefinically unsaturated acid such as methyl methacrylate to a suitable amount of water, which preferably contains a protective colloid, then adding a free radical catalyst, such as an organic peroxide thereto and heating the mixture to 50 to 80° C. under an atmosphere of nitrogen for half an hour with vigorous stirring. During the polymerisation, which is finished after 1 to 2 hours, the reaction temperature usually rises to a temperature in the region of from about 70 to 95° C. The resulting thermoplastic copolymers are obtained in the form of colorless, well formed beads. The mother liquors resulting after the separation of the beads may conveniently be used again for the polymerisation after the addition of a monomer and a catalyst. Yields of between 85 and 98% of the theoretical yield have been obtained.

The copolymerisation is preferably carried out in suspension or emulsion in an aqueous medium, and suitably at a pH-value of 5 to 9. The mixture may also be copolymerized per se or in an inert organic solvent, e.g. in an aliphatic or aromatic hydrocarbon such as benzene, toluene or xylene or in a polar solvent such as a ketone or cyclic ether, e.g. methylethylketone or tetrahydrofuran. It may also be carried out at elevated pressure and/or stepwise, e.g. by adding only a part of the reaction components to water and adding the remainder during the polymerisation. The minimum temperature, at which the polymerisation can be carried out depends on the activation temperature of the polymerisation catalyst used i.e. the temperature at which the polymerisation commences.

The protective colloid used may for example be agar agar, polyvinyl alcohol, carboxymethyl cellulose, a water-soluble urea- or melamine-aldehyde resin, barium sulphate or bentonite, but is preferably a pulverized copolymer obtained according to the process of present invention, or mixtures of two or more of such substances.

The proportion of the acetal occurring in the copolymer produced may be determined by thermal decomposition of the copolymer at a temperature above 400° C. The degradation products are pased through a receiver containing p-toluene sulphonic acid and the aldehyde formed is determined as oxime. In addition the acetals may be shown to be present in the copolymers be infrared spectroscopy. The spectrum shows the typical acetal bands. If the unsaturated cyclic acetal still has a free hydroxyl group an intensive OH-band appears.

Particularly preferred unsaturated cyclic acetals for use in the present invention are those which have one group having the formula:

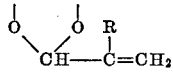

in which R is hydrogen, a lower alkyl radical having for example, 1–4 carbon atoms e.g. methyl, or a halogen atom e.g. chlorine. Such compounds may be produced for example from alcohols having at least two hydroxyl groups, especially aliphatic or cycloaliphatic alcohols or dihydric phenols the hydroxyl groups of which are in the ortho or meta positions with respect to each other, by acetalisation with acrolein or preferably its α-position substituted drivatives. If the alcohols used for the productions of actols contain more than 2 hydroxyl groups, such as pentaerythritol or trimethylolethane the acetals will contain free hydroxyl groups. Acetals of crotonaldehyde may also be used. Examples of acetals which may be used in the process according to the invention include:

2-vinyl-1,3-dioxane;
2-vinyl-4-(ω-hydroxybutyl)-1,3-dioxolane;
2-vinyl-1,3-dioxolane;
2-vinyl-5-(β-hydroxy)-propyl-1,3-dioxane;
2-vinyl-5-ethyl-5-methylol-1,3-dioxane;
2-vinyl-4-methyl-1,3-dioxane;
2-vinyl-4-methyl-1,3-dioxolane;
2-vinyl-5-(nor-dicyclopentadienyloxymethylene-5)-ethyl-1,3-dioxane;
2-vinyl-5-chloromethyl-1,3-dioxolane;
2-vinyl-4-phenyl-5-(ω-hydroxy)-butyl-1,3-dioxolane;
2-vinyl-4-(4'-hydroxycyclohexyl)-methyl-1,3-dioxolane;
2-vinyl-4-phenyl-5-(ω-hydroxy)-propyl-1,3-dioxolane;
2-isopropenyl-1,3-dioxane; and
2-vinyl-5-(ω-hydroxypropyl)-5-hydroxymethyl-1,3-dioxane.

Acetals of polyhydric alcohols or the corresponding phenols in which one or more of the hydroxy groups have been etherified or esterified before the acetalisation or polymerisation may also be used provided said modified alcohols still contain at least two e.g. three, hydroxy groups and said phenols still contain two hydroxy groups. The radicals with which these hydroxy groups may be etherified or esterified are for example radicals of monocarboxylic acids having up to 12 carbon atoms or of alcohols such as butanol or allyl alcohol.

In order to obtain partially cross-linked products cyclic acetals of acrolein may also be used which have more than one polymerisable ethylenic double bond in the molecule such as diallylidene pentaerythritol or the cyclic diacetal of 3,3,5,5-tetramethylol-4-hydroxy-2,6-H-pyrane, suitably in a small proportion, generally below 1% of the total weight of the monomers used.

Particularly suitable monomeric derivatives of the α,β-ethylenically unsaturated acid are the esters thereof for example the methyl, ethyl, propyl, butyl, isobutyl, hexyl, decyl, lauryl, stearyl, hydroxyethyl or hydroxypropyl esters of acrylic acid or the homologues thereof such as methacrylic, ethacrylic or α-phenylacrylic acid. Amides of these acids which may be substituted such as the N-alkyl- or N-alkylolamides, e.g. N-methyl-acrylamide, methacryliamide or N-methylolacrylamide, and N-dialkylamides may also be used. Generally the radicals attached to the nitrogen atom should contain not more than 4 carbon atoms. Nitriles such as acrylonitrile may also be used as the derivative of the α,β-olefinically unsaturated acid.

The monomeric derivatives of the α,β-olefinically unsaturated acid used according to the invention particularly where said derivatives are acrylates or methacrylates may also be used together with up to the double, preferably up to the same molar amount of one or more other unsaturated monomers having the group

Examples of such other monomers include styrene, substituted styrenes such as α-methyl styrene, vinyl chloride, vinylidene chloride, butadiene, vinyl- or allyl-esters and -ethers, e.g. vinyl-acetate, -propionate, -stearate, -borate, allyl acetate or -borate, N-vinyl pyrrolidone or N-vinylcaprolactam or esters of vinylphenylboric acid or vinylphosphoric acid or esters of α,β-ethylenically unsaturated dicarboxylic acids such as itaconic, maleic or fumaric acid and anhydrides of such acids where such exist.

The acetals and the monomeric derivatives of the acid are conventiently used in a weight ration of 9:1 to 1:20, preferably of 1:1 to 1:9.

Various polymerisation catalysts may be used in order to effect the polymerisation. Suitable catalysts include the free radical generating catalysts e.g. benzoyl peroxide, dipropyl, dilauryl, tert.-butyl, ditert.-butyl, acetyl, diacetyl, succinyl peroxide, acetyl-benzoyl peroxide, tert.-butylperbenzoate or -permaleate. Catalysts of the azo-type e.g. α,α-azo-bis-iso-butylronitrile, dimethyl-α,α-azobisisobutyrate, α,α - azo-bis-(α-ethylbutyronitrile), α,α-azo - bis-(α-n-butylcapronitrile), α,α-azo-bis-(α-isobutyl-γ - methylvaleronitrile), α,α-azo-bis-(α,β-dimethylbutyronitrile), 1,1'-azodicyclopentane-carbonitrile may also be used. The Redox-systems, e.g. hydrogen peroxide/Fe++, potassium persulfate/Ag+, potassium persulphate/Fe++, ammonium persulphate/Ti+++, tert.-butylhydroperoxide/Fe++ may also be used as catalysts.

The copolymerisation process may be improved by the use of accelerators. Such accelerators include, for example, derivatives of sulphinic acid, e.g. the reaction products thereof with formaldehyde, or the reaction products of methylolsulphinic acids with amines. In addition, complexes of copper or iron acetylacetonate may be used. Other accelerators which may be used include the lead, cobalt or manganese naphthenates or octoates or tertiary organic amines such dimethylaniline, dimethyl-p-toluidine or trihexylamine.

Polyisocyanates which may for example be reacted with the copolymers of the present invention include ethylenediisocyanate; propylene-1,2-diisocyanate: butylene-1,3-diisocyanate; hexamethylene-diisocyanate; cyclohexylene-1,2-diisocyanate; phenylene-1,3-diisocyanate; the various tolylenediisocyanates such as 1-methyl-phenyl-2,4-diisocyanate; 1-methyl-phenyl-2,6-diisocyanate and triphenylenemethane-4,4',4"-triisocyanate. Masked polyisocyanates as obtained by the reaction of these isocyanates with polyhydric alcohols may also be used.

A convenient method of preparing the products modified with polyisocyanates is to dissolve the solid copolymers in an organic solvent for example a ketone such as methylethylketone and to add the polyisocyanate to this solution. Film-like coatings produced from these solutions dry very quickly so that no dust adheres after only a few minutes drying time and have very scratch-resistant surfaces.

The copolymers produced according to the present invention has many uses. The properties and the processing temperatures of these copolymers are to a large extent dependent on the actual method of polymerisation employed as well as on the structure of the copolymers and both the factors may be varied over wide limits. Thus, the adherence of copolymers prepared in solution or emulsion on base materials may be improved by the use of a small amount, e.g. 0.5 to 5 percent, calculated on the weight of the monomers, of acrylic, methacrylic or crotonic acid or a mixture thereof. Copolymers obtained by the suspension polymerisation method may be injection molded into shaped bodies having considerable toughness. The flow properties of the polymers of the present invention with regard to their use in injection molding machines is better than that of the pure polymethacrylates. Stable emulsions of the polymers of the present invention are suitable for example for treating textiles, for the impregnation of synthetic fibres and for the finishing of the textile base layers in artificial leather fabrics.

The copolymers obtained by solution polymerisation may for example be used for the manufacture of adhesive tapes, as adhesives for plastics, for surface coatings, and as binding agents for wood, glass and metal. Film-like coatings may be prepared therefrom, which dry tack-free at room temperature. Driers such as the cobalt, lead or manganese naphthenates or -octoates may be conveniently added in some cases. If desired, the films may also be stoved. Particularly, if the copolymerisation is carried out without using a solvent stress free shaped bodies are obtained which are suitable for the manufacture of optical glasses. The copolymers may also be dissolved in methacrylic acid esters and these mixtures may be used for the manufacture of plastics reinforced by glass fibres and/or textile fibres. Other fillers may also be incorporated. Further it may sometimes be of advantage to add optical bleaching agents or stabilizers against ultraviolet light during the manufacture of the copolymers.

The polymers modified by polyisocyanates have additional uses besides those already mentioned; for example they are suitable for the manufacture of transparent expanded plastics. Moreover they give rise to excellent bond strengths when used to join wood, glass or metal and they are also distinguished by an excellent adherence on wood, glass and metal.

The following examples illusrtate the present invention. All parts given in the examples are parts by weight.

Example 1

A mixture of 400 parts of water, 0.25 part of powdered agar agar as protective colloid, 75 parts of methyl methacrylate, 15 parts of 2-vinyl-5-methylol-5-ethyl-1,3-dioxane and 1 part of benzoyl peroxide were mixed together in a 1 litre, three neck flask provided with a good stirrer, a tube for introducing an inert gas such as nitrogen, a thermometer and a reflux condenser. The mixture was heated with stirring within 30 minutes to 80° C. After the polymerisation began the temperature rose gradually to 95° C. The stirring was continued at this temperature for 1 to 1½ hours. After this period a copolymer was obtained in the form of colorless well-shaped beads which were filtered off, washed with water and then dried. Yield: 85 parts. Melting range: 150–180° C.

Test rods produced from these coplymers by injection molding, have a flexural strength of 1240 kg./cm.$^2$ and an impact strength of 19 kg. cm./cm.$^2$. The flow properties of the copolymer beads in injection molding machines are very good.

Example 2

3500 parts of water were mixed with 15 parts of trisodium phosphate and 3 parts of agar agar in the apparatus described in Example 1.

1125 parts of methyl methacrylate, 375 parts of 2-vinyl-5-methylol-5-ethyl-1,3-dioxane and 5 parts of $\alpha,\alpha$-azo-bisisobutyronitrile were added to this mixture with stirring and under nitrogen. The raction mixture was heated with vigorous stirring to about 80° C. In the course of the polymerisation the temperature rose to 95° C. After a polymerisation period of 2 hours, 1360 parts of copolymer were obtained. The well-shaped colorless beads were filtered off, washed with water and then dried. They were suitable for processing to shaped bodies by injection molding.

Example 3

A mixture of 400 parts of water, 0.25 part of agar agar, 90 parts of methyl methacrylate and 10 parts of 2-vinyl-5-(nor dicyclopentadienyloxymethylene)-5-ethyl-1,3-dioxane (obtained by the addition of trimethylolpropane to dicyclopentadiene in the presence of a catalytic amount of perchloric acid and reaction of the ether alcohol formed with acrolein) was admixed with one part of benzoyl peroxide and polymerised as described in Example 1. 98 parts of copolymer beads were obtained, which after separation and usual purification may be processed by injection molding. The injection molded parts had a bending strength of 1200 kg./cm.$^2$ and an impact strength of 15 kg. cm./cm.$^2$.

Example 4

A mixture of 35 parts of methyl methacrylate, 30 parts of dimethyl itaconate, 25 parts of 2-vinyl-5-chloromethyl-1,3-dioxolane and 3 parts of barium sulphate in 400 parts of water and 1.5 parts of diacetyl peroxide was polymerized as described in Example 1. After a polymerisation period of 90 minutes, 79 parts of well-shaped copolymer beads were obtained.

Example 5

400 parts of water, 0.25 part of agar agar, 2 parts of tri-sodium phosphate, 50 parts of methyl methacrylate, 25 parts of 2-vinyl-5-(nor-dicyclopentadienyloxymethylene)-5-ethyl-1,3-dioxane and 25 parts of 2-vinyl-4-($\omega$-hydroxybutyl)-1,3-dioxolane after the addition of 1.5 parts of $\alpha,\alpha$-azo-bis-($\alpha$-ethylbutyronitrile) were copolymerized as described in Example 1. A copolymer was obtained in the form of slightly yellowish colored beads which were filtered off, washed with water and dried. Yield: 96 parts. This copolymer may be used for the manufacture of aqueous dispersions.

Example 6

50 parts of polymer beads, produced by the suspension polymerisation of 60 parts of methyl methacrylate, 5 parts of N-methylol-acrylamide and 35 parts of 2-vinyl-5-ethyl-1,3-dioxane, were dissolved in 125 parts of methylethylketone and this solution the solids content of which is 28.6%, was admixed with 15 parts of a 75% solution (in ethyl acetate) of a masked polyisocyanate, which had been prepared from 1 mol of trimethylolpropane and 3 mols of tolylene-2,4-diisocyanate. Film-like coatings on glass and metal were prepared from this mixture having a thickness of 200 microns. After 2 to 3 minutes drying time these coatings were so dry that no dust adhered and after a few hours they were very scratch resistant. The resistance of these film-like coatings against some chemicals were good. The elasticity of these surface coatings could be further improved by adding minor amounts of a plasticizer, e.g. dioctyl phthalate.

Example 7

A mixture of 400 parts of water, 75 parts of methyl methacrylate, 25 parts of 2-vinyl-5-hydroxymethyl-5-ethyl-1,3-dioxane, 2 parts of trisodium phosphate and 0.5 part of a finely powdered copolymer of 75 parts of methyl methacrylate and 25 parts of 2-vinyl-5-hydroxymethyl-5-ethyl-1,3-dioxane as protective colloid, is heated with vigorous stirring for 4 hours to 60° C. and for 1 hour at 70° C. 90 parts of well-shaped copolymer beads are obtained from which clear, shaped bodies may be obtained by injection molding.

Example 8

The procedure of Example 7 was repeated except that the protective colloid was replaced by 5 parts of a water-soluble melamine-formaldehyde condensate. On carrying out the reaction in the same manner as in Example 8 88 parts of a copolymer are obtained. Clear, shaped bodies obtained from the copolymer beads by moulding at 160–165° C., have a flexural strength of 1200–1300 kg./cm.²

It is not intended that the examples given herein should be construed to limit the invention thereto, but rather they are submitted to illustrate some of the specific embodiments of the invention. Resort may be had to various modifictaions and variations of the present invention without departing from the spirit of the discovery or the scope of the appended claims.

What is claimed is:

1. A copolymerizable mixture which comprises an aqueous dispersion of (A) a cyclic acetal of an α,β-olefinically unsaturated aldehyde of 3 to 7 carbon atoms, said acetal being selected from the group consisting of 1,3-dioxolanes and 1,3-dioxanes and having only one heterocyclic group which is said acetal group and only one copolymerizable group which is the olefinic unsaturation derived from said aldehyde and (B) a reactant selected from the group consisting of (1) at least one monomer selected from the group consisting of the esters, amides, and nitriles of acrylic and methacrylic acid containing no substantial amount of free acid groups and (2) mixtures of (1) with at least one other monomer containing the group

in a molar amount not exceeding twice the molar amount of (1); the amount of component (A) and (1) being in the weight ratio from 9:1 to 1:20 and said aqueous dispersion having a pH of about 5 to 9 and containing an amount of protective colloid sufficient to maintain the dispersion.

2. A copolymerizable mixture as claimed in claim 1 wherein the protective colloid is a pulverized copolymer obtained from a mixture as defined in claim 1.

3. A copolymerizable mixture as claimed in claim 2 wherein the molar amount of said other monomer present does not exceed the molar amount of said derivative of the α,β-olefinically unsaturated acid.

4. A copolymerizable mixture as claimed in claim 2 also containing a polymerization accelerator.

5. A copolymerizable mixture as claimed in claim 2 wherein the acetal is derived from a compound selected from the group consisting of acrolein and α-substitution products thereof and wherein the α-substitution group is an aliphatic group containing from 1 to 4 carbon atoms.

6. A copolymerizable mixture as claimed in claim 2, also containing up to 1% of a cyclic acetal of an α,β-olefinically unsaturated aldehyde, containing more than one copolymerizable α,β-olefinic bond and being a diallylidene derivative of a tetramethylol compound, the percentage figure being referred to the total weight of the monomer.

7. A copolymerizable mixture as claimed in claim 2 wherein the derivative of the α,β-olefinically unsaturated acid is an ester foarmed from a monohydric aliphatic alcohol having from 1 to 18 carbon atoms.

8. A copolymerizable mixture as claimed in claim 2 wherein the acetal and the derivative of the α,β-olefinically unsaturated acid are present in a weight ratio of from 1:1 to 1:9.

9. A copolymerizable mixture as defined in claim 1 wherein A is as defined in claim 6, reactant B(1) is selected from the group consisting of methyl and ethyl esters and A and reactant B(1) are present in a weight ratio between about 1:1 to 1:9.

10. A process for the production of a copolymer which comprises copolymerizing a copolymerizable mixture as claimed in claim 1 by heating it at atmospheric pressure with stirring in the presence of 0.5 to 3.5 parts by weight of a free radical polymerization catalyst to a temperature in the range from 50° C. to 95° C. under an atmosphere of an inert gas.

11. A process as claimed in claim 10 in which further amounts of a copolymerizable mixture as claimed in claim 17 are added during the copolymerization.

12. Copolymer beads obtained by the process defined in 10.

13. A reaction product of a copolymer as claimed in claim 12 with up to 1% of at least one polyisocyanate selected from the group consisting of hydrocarbondiisocyanates, the hydrocarbon radicals of which contain from 2 to 7 carbon atoms, and triphenylenemethane-triisocyanates.

14. Shaped bodies formed by injection molding and containing at least in part a product as claimed in claim 12.

15. Film-like coatings containing at least in part a product as claimed in claim 12.

References Cited

UNITED STATES PATENTS 3,281,377  10/1966  Lederer _____ 260—2.5

JAMES A. SEIDLECK, Primary Examiner

J. C. HAIGHT, Assistant Examiner

U.S. Cl. X.R.

117—161; 260—17, 31.8, 67, 73, 77.5, 80.72, 88.3, 340.7

PO-
(5/6)

UNITED STATES PATENT OFFICE
CERTIFICATE OF CORRECTION

Patent No. 3,471,430          Dated October 7, 1969

Inventor(s) Rolf Zimmerman and Hermann Hotze

It is certified that error appears in the above-identified patent and that said Letters Patent are hereby corrected as shown below:

In the specification, column 3, line 2, correct the spelling of "passed"; column 3, line 5, change "be" to -- by --; column 3, line 24, correct the spelling of "derivatives"; column 3, line 25, change "actols" to --acetals--; column 3, line 73, correct the spelling of "methacrylamide";
column 4, line 24, correct the spelling of "conveniently"
column 5, line 70, correct the spelling of "reaction";
column 6, line 74, change "8" to --7--;
In the claims, column 7, line 32, change "about" to --from--;
column 8, line 6, correct the spelling of "formed";
column 8, line 26, change "17" to --1--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents